Sept. 30, 1969      J. BEAVERS      3,469,831
HEAT TREATMENT FURNACE
Original Filed Nov. 10, 1966      3 Sheets-Sheet 1
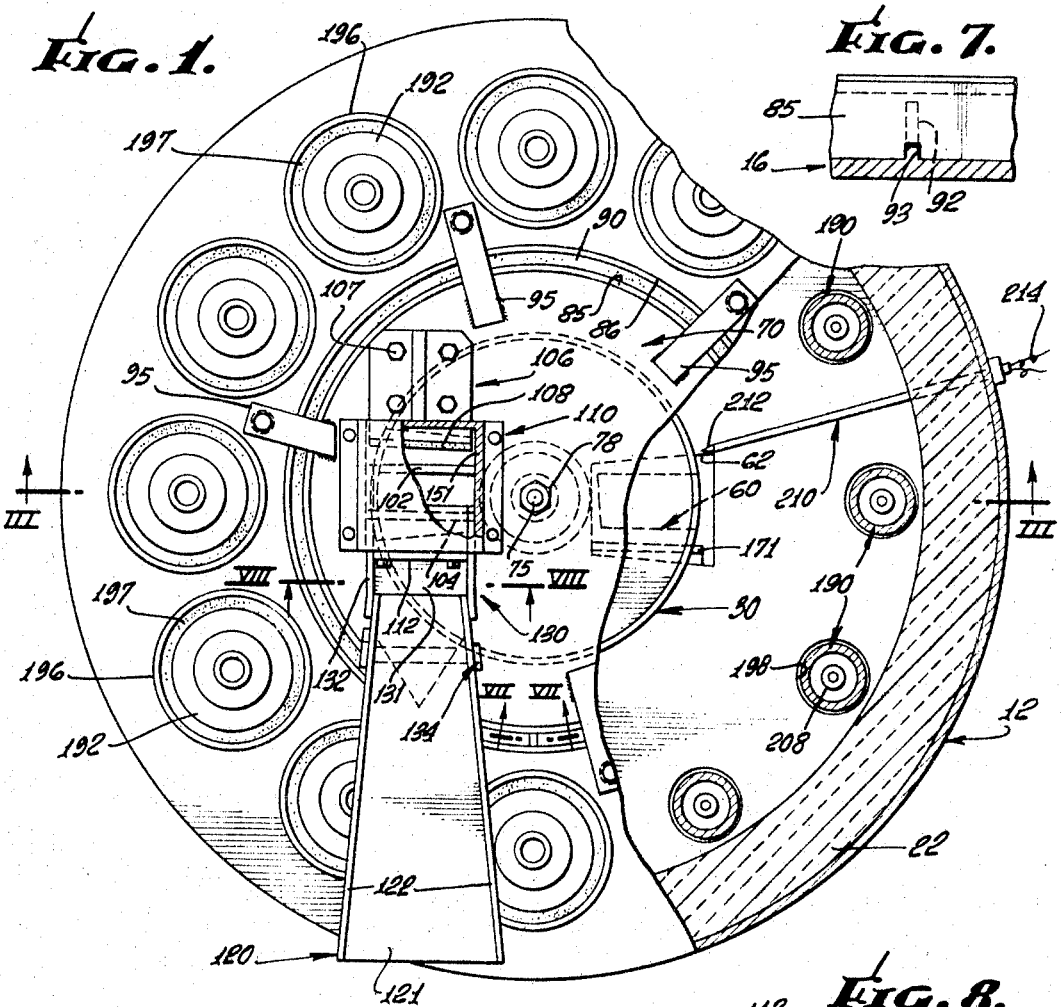
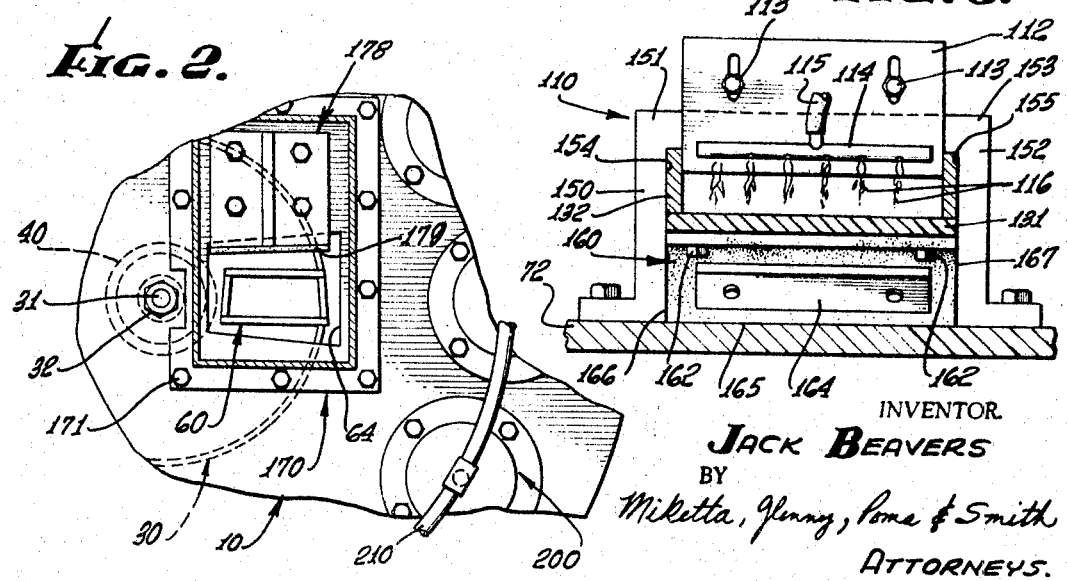
INVENTOR.
JACK BEAVERS
BY
Miketta, Glenny, Poms & Smith
ATTORNEYS.

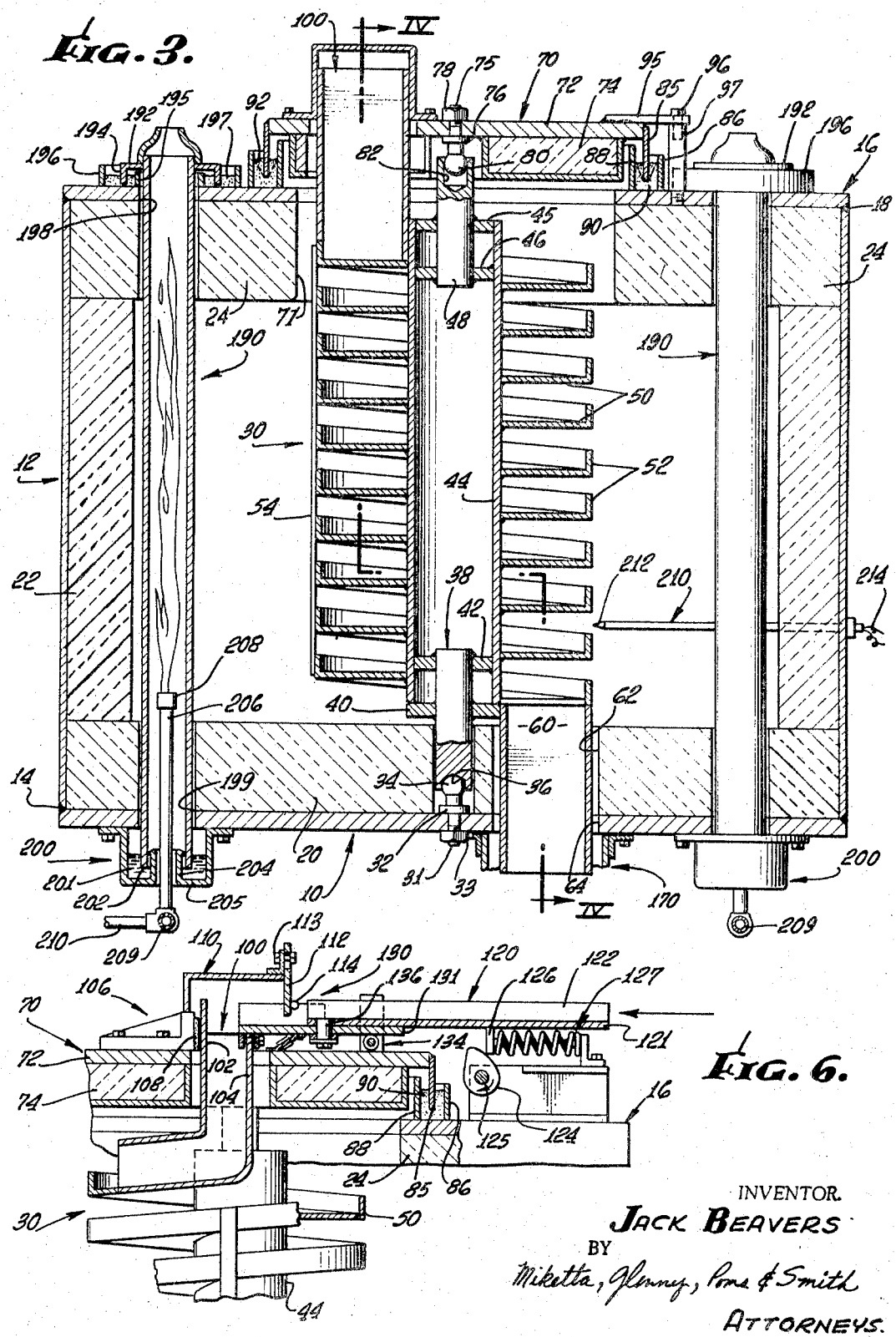

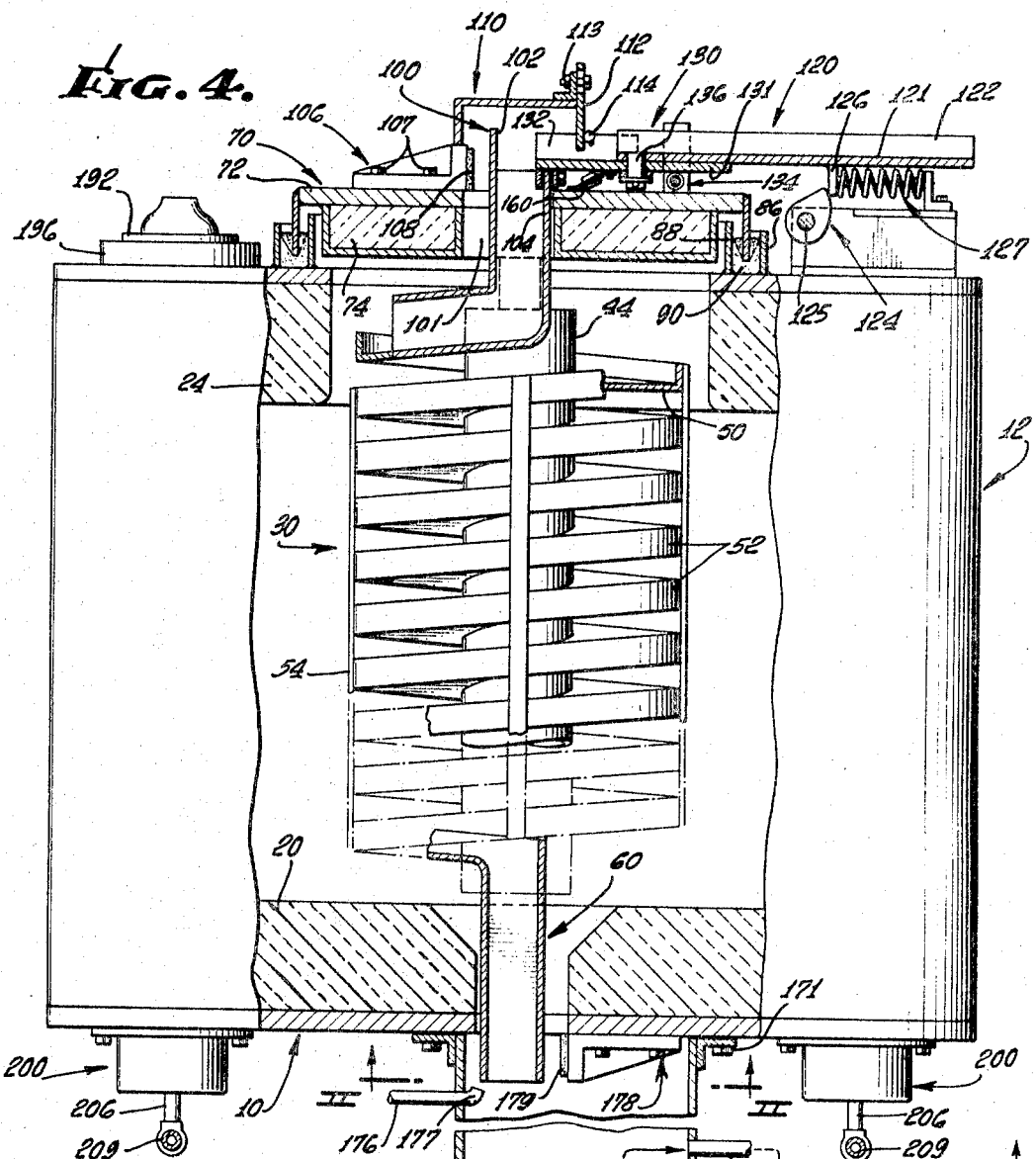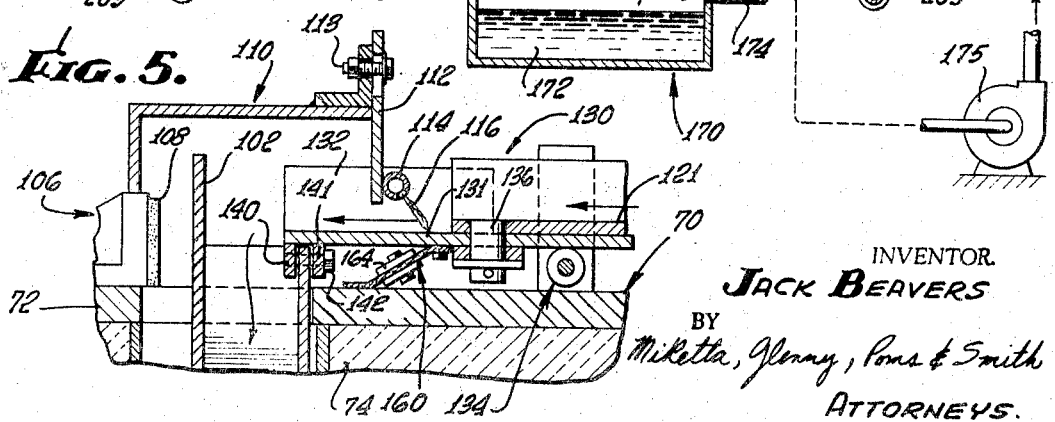

United States Patent Office  3,469,831
Patented Sept. 30, 1969

3,469,831
HEAT TREATMENT FURNACE
Jack Beavers, 5200 Tweedy Blvd.,
South Gate, Calif. 90280
Continuation of application Ser. No. 593,524, Nov. 10, 1966. This application July 17, 1968, Ser. No. 749,246
Int. Cl. C21d 1/66; F27b 9/14
U.S. Cl. 266—4                                         10 Claims

ABSTRACT OF THE DISCLOSURE

A workpiece heat treating table formed as a helix about a vertical axis, mounted for cyclic rotational vibration within a refractory lined housing having arcuately spaced vertically extending heating means, the housing including a removable cover providing means for journaling the upper end of the table whereby to permit vertical expansion and contraction of the table relative to the housing and to facilitate removal and replacement of the table; workpiece feed platform and apron to supply workpieces through a supply chute to the upper end of the table including means for reciprocatingly vibrating the platform and apron and for rotationally vibrating the helical table, and having atmosphere control means providing a flame curtain inhibiting the entrance of oxygen; a lower discharge chute from the table into a quench tank, and means for controlling the entrance of gas from the tank into the furnace housing; and buffer means at upper and lower ends of the table to minimize shock and torsional stress during rotational vibration of the table.

---

This is a continuation of application Ser. No. 593,524, filed on Nov. 10, 1966, now abandoned.

This invention relates generally to furnaces for treating metal parts by heating them in a controlled atmosphere and under conditions of controlled temperature and time such as in the processes of carburizing, annealing, hardening and the like; and more particularly the invention relates to a furnace of this type wherein the articles being heat treated, or workpieces, follow a path in the shape of a helix around a vertical axis.

In a preferred embodiment of the invention hereinafter illustrated and described in detail, feed means are provided above the upper end of the helical table, including a feed platform and apron for depositing workpieces on the upper end of the helical table; the helical table itself is mounted for rotational vibration within a generally cylindrical furnace enclosure having a vertically disposed, generally cylindrical refractory wall, and including a number of heating elements in the form of vertically extending tubes spaced equally angularly about the inner surface of the cylindrical wall, being spaced radially outwardly from the helical table.

Means are provided for imparting cyclic rotational vibration to the helical table, whereby workpieces are caused to travel through the furnace at a controllable rate. Desirably such means include means longitudinally vibrating the feed platform and apron.

In heat treatment generally, it is necessary to control the composition of the atmosphere within the furnace, particularly to minimize and preferably eliminate the presence of oxygen therein. Means are accordingly desirably provided in the present invention for injecting into the interior of the furnace a stream of gas of predetermined composition; and for the same purpose, means are desirably provided at the upper or feed end of the furnace for creating a curtain of flame through which workpieces enter, thereby preventing oxygen from entering the furnace.

It is accordingly a principal object of the present invention to disclose and provide a heat treatment furnace of novel construction providing a path for workpiece movement in the form of a vertically disposed helix; to provide, in such a furnace, feed means for supplying workpieces to be heat treated at the upper end of the helix, the feed means being connected to the helix and being adapted to impart rotational vibration to the helical table; to provide, in such a heat treatment furnace, means for minimizing the entrance of oxygen into the atmosphere within the furnace; to provide a heat treatment furnace having a relatively long path of travel of the workpieces being heat treated, but occupying a very much smaller area than the same length of travel in a conventional rectangular bed furnace; and for other and additional objects and purposes as will be understood from a reading of the following description of a preferred embodiment of the invention, taken in connection with the accompanying drawings in which:

FIG. 1 is a top plan view of a preferred embodiment of a furnace in accordance with the present invention, parts being broken away for clarity of illustration.

FIG. 2 is a fragmentary sectional view of the bottom of the furnace, looking upwardly on the line II—II of FIG. 4.

FIG. 3 is a vertical sectional view taken on line III—III of FIG. 1.

FIG. 4 is a vertical sectional view taken along the broken section line IV—IV of FIG. 3, showing the feed platform, apron and helical table at substantially one limit of their vibratory movement.

FIG. 5 is a fragmentary sectional view on an enlarged scale of the parts in the upper portion of FIG. 4.

FIG. 6 is a view similar to FIG. 5 showing the moving parts at the other limit of their vibratory movement.

FIG. 7 is a fragmentary view on line VII—VII of FIG. 1.

FIG. 8 is a fragmentary sectional view taken on line VIII—VIII of FIG. 1, showing details of the sealing means at the upper feed end of the present furnace.

Referring now in detail to the drawings, the general construction of the present furnace will be best understood by reference to FIGS. 1 and 3. Thus the furnace as seen in FIG. 3 includes a generally circular steel base plate indicated generally at 10, an upwardly extending cylindrical steel wall indicated generally at 12 and fixed to the base plate 10 as by weld 14, and an upper plate indicated generally at 16 and fixed as by weld 18 to the upper annular edge of the cylindrical side wall 12. The enclosure formed by the parts just enumerated is lined with conventional refractory material, including a lower disk refractory 20, an upright annular refractory 22, and an upper disk refractory 24.

The generally helically-shaped table of the present invention is indicated generally at 30 and is mounted concentrically with the cylindrical enclosure just described. In the present illustrative embodiment of the invention, there is provided centrally of the base plate 10 a vertically disposed bolt 31 having an enlarged shoulder 32, the shank of the bolt extending downwardly through an opening formed centrally in the base plate and being fixed to the plate as by nut 33. Upwardly, the bolt is provided with a spherical head 34 which forms a rotatable support bearing in a counterbore 36 of a central support post indicated generally at 38. Fixed to the support post 38 are a pair of annular plates, a lower plate 40 and an upper plate 42, each of the plates being fixed as by welding to a central tubular support member 44 of the table 30. The tubular support member is provided with means journalling it in vertical central relation to the furnace housing enclosure and permitting rotational vibration of the table 30, such means including annular plates 45 and 46 fixed to the upper portion of the tube 44 as by welding, and a central upper support post 48 extending through central openings in the plates 45 and 46 and fixed thereto as by welds. Support post 48 is pivotally mounted by means to be later described.

The table 30 provides a generally helical path for workpieces passing through the present furnace from the upper end of the helix, generally adjacent upper support post 48, to the lower end of the helix, generally adjacent lower support post 38. The table, as best seen in FIG. 3, includes a bed 50 which, as seen in section, extends horizontally outwardly from the tubular member 44. The outer end of the bed 50 is defined by an upstanding flange 52, and the several turns of the table are strengthened by one or more vertically extending straps 54 fixed as by welding to the outer surfaces of the upstanding flanges 52. The lower or discharge end of the helical table is provided with a downwardly projecting discharge chute indicated generally at 60, which may be approximately rectangular in shape (see FIG. 2), the chute 60 extending through openings 62 and 64 formed in refractory 20 and bottom plate 10 respectively. Workpieces discharged from chute 60 may be fed to a quench bath fragmentarily indicated generally at 170 in FIG. 3, to be described later in detail in connection with FIG. 4.

The upper end of the furnace enclosure is provided with an opening 71 which has a size, as shown, permitting table 30 to pass axially therethrough, as for repair or replacement of the table. During operation, opening 71 is closed by a cover indicated generally at 70 and including a generally circular steel plate 72 provided with a refractory lining 74. Means are provided centrally of the cover 70 for pivotally journalling the upper end of the table 30, permitting vertical expansion and contraction of the table incident to effects of temperature during use. Thus there may be provided a bolt 75 having an enlarged shoulder 76, the shank of the bolt passing through a central aperture in the plate 72 and being fixed thereto by fastening means 78. The lower end of the bolt is provided with a spherical head 80 rotatably and slidably received in a bore 82 formed in the upper portion of support post 48.

Cover 70 is removably supported on the upper plate 16 of the furnace by means minimizing entry of outside air and other gas into the enclosure of the furnace. Thus the cover may be provided with an annular downwardly extending peripheral flange 85, the lower edge of the flange resting on the plate 16 of the furnace. An annular trough surrounds the flange 85, the trough being formed by upstanding annular flange members 86 and 88 fixed to the upper surface of plate 16 and provided with a quantity of sand or similar granular material 90 in the trough surrounding the annular flange 85 of the cover. Means are desirably provided within the trough for centering and positioning cover 70, such means being here shown as including a number of ribs or gussets 92 having opposed, inclined faces for receiving therebetween the lower portion of the cover flange 85. A number of such pairs of gussets may be provided, spaced angularly about the trough and, as best seen in FIG. 7, a small notch 93 may be formed in the lower edge of the flange 85 at each of the gusset locations, whereby to position the cover 70 angularly relative to the furnace housing upper plate 16.

Additional means may be provided for retaining the cover 70 firmly and accurately in position, such additional means being here shown as including one or more hold-down straps 95 welded or otherwise fixed to the plate 72 of cover 70 and projecting radially beyond the periphery of the cover. The outer end of strap 95 is provided with an opening through which a bolt 96 extends into a stud 97, which is in turn threaded into the cover plate 16 of the furnace housing. As will be seen in FIG. 1, a number of additional such hold-down straps 95 may be provided, spaced angularly around the cover 70. As will be later understood, the construction is desirably such as to enable the cover 70 to remain in fixed relation with the furnace proper in spite of cyclic impulses during operation tending to rotate the cover relative to the furnace.

Means are provided in association with cover 70 for feeding workpieces to be heat treated in the present furnace and for imparting rotational vibration to the table 30. A preferred form of such means will be understood by reference to FIGS. 1 and 4 in the drawings. At the upper end of helical table 30 and projecting upwardly therefrom is a feed chute indicated generally at 100, extending through an opening 101 in cover 70. A seen in FIG. 4, one wall 102 of chute 100 extends somewhat higher than the opposite wall 104. Buffer means indicated generally at 106 are provided on the upper plate 72, being attached to the latter as by bolts 107, buffer 106 being provided with a layer 108 of somewhat resilient material against which wall 102 of chute 100 repetitively strikes during operation, as will be later understood. A bonnet indicated generally at 110 is attached to the cover 70 and generally surrounds the upper part of chute 100 and is provided, as best seen in FIG. 8, with a gate 112 which is vertically adjustable by means 113 relative to the bonnet proper. At the lower end of gate 112 there may be provided a tube 114 which may be supplied with combustible gas through conduit 115 from a suitable source not shown, the tube being provided with a number of generally downwardly directed orifices for providing a flame 116 along the lower edge of gate 112, to prevent entrance of oxygen into the furnace.

The feeding means includes a feed platform indicated generally at 120 having a generally flat bed 121 and upstanding side walls 122. The feed platform 120 is here shown relatively short, but it will be understood that it may have any length desired. Means are provided for imparting to the feed platform cyclic vibratory motion, such means including a cam indicated generally at 124 rotatable about a shaft 125 by means not shown, in a clockwise direction as seen in FIG. 4. The cam bears against a shoulder 126 fixed to the bed 121 and extending downwardly therefrom, and resilient means indicated generally at 127 are provided for urging the feed platform 120 leftwardly as seen in FIG. 4.

Means are provided for mechanically interconnecting the feed platform 120 and the helical table 30 of the present invention. Such means are here shown as including an apron indicated generally at 130 having a flat bed 131 underlying bed 121 of the feed platform, and upstanding side walls 132 outwardly of side walls 122 of the feed platform. Apron 130 is supported on roller means indicated generally at 134, and is connected to feed platform 120 by means permitting some pivotal movement between the feed platform and the apron. Such means are here shown as including a vertically disposed pivot pin 136 carried by the feed platform and extending downwardly therefrom, the pin 136 being pivotally journaled in an opening formed in the bed 131 of the apron.

Means are provided for connecting the left end of the apron, as seen in FIG. 4, to the feed chute 100 and for permitting at least some pivotal movement between those two members. As best appears in FIG. 5, such means are here shown as including a pair of spaced ears or lugs 140 and 141 extending downwardly from the inner end of bed 131 of the apron and a bolt 142 extending through the ears and threaded therein. The shank of bolt 142 passes through an opening in the upper portion of wall 104, the thickness of wall 104 and the diameter of the opening therethrough, as well as the loose spacing of lugs 140 and 141 from wall 104, being such as to permit the pivotal movement between apron 130 and chute 100 previously mentioned.

It will be recalled that oxygen is excluded from entering the furnace by flame 116 along the lower edge of gate 112, above the apron bed 131.

Means are also provided in connection with the feed means for excluding oxygen from entering the interior of the furnace beneath the apron 130. With particular reference to FIG. 8, it will be seen that the front wall of the bonnet 110 includes a pair of laterally spaced flank portions 150 and 152 on either side of the vertically adjustable gate 112. The upper parts 151 and 153 of flank portions 150, 152 are in slidable contact with the side walls of the gate, and the outer surfaces of the side walls 132 of the apron 130 are similarly in slidable contact with the flank portions 150 and 152 along their respective inner edges 154 and 155. Beneath the apron 130 is a barrier member indicated generally at 160 and desirably made of a heat-resistant material such as asbestos or the like. It is attached along its upper edge to the bottom 131 of the apron by suitable means 162. The barrier pad is generally rectangular in shape, but is weighted by one or more elements 164, such as metal blocks or the like, attached to the pad in its central portion. Thus, the lower edge 165 of the pad is in slidable and substantially hermetic contact with the upper surface of the cover plate 72 and the lateral edges 166 and 167 of the pad are in slidable and substantially hermetic contact with the inner edges 154 and 155 previously mentioned.

With further reference to FIG. 4 and particularly the lower portion thereof, means are provided for introducing an atmosphere of controllable content into the furnace enclosure; and particularly for eliminating the entrance of air or other oxygen-bearing gas therein. An open-topped quench tank indicated generally at 170 may be fixed by suitable means 171 to the lower surface of the furnace base plate 10. The tank includes a quantity of quench liquid 172 in the lower portion thereof, and there is desirably provided means for removing vapors from the quench liquid, such means being here shown as an eductor conduit 174 attached to an exhaust pump 175. Means are also provided for introducing a gas of desired chemical content into the quench tank, and thereby into the interior of the furnace. Such gas supply means may include a conduit 176 extending through the quench tank wall and having an outlet opening 177 within the quench tank, well above the level of liquid therein.

In order to minimize the effects of torsional stress in the table 30, buffer means may be provided to be cylically abutted by the lower portion of discharge chute 60 during operation of the furnace. Such buffer means are indicated generally at 178, and the buffer is generally similar in construction and function to buffer 106 previously described at the upper end of the furnace. Thus, the lower buffer 178 is provided with a layer of somewhat resilient material 179, against which the discharge chute 60 abuts.

Means are provided for heating the interior of the present furnace to the proper temperature for the particular heat treatment operation being carried out. In the present embodiment of the invention, the heating means are shown as including twelve heating assemblies, each provided with a vertically extending tube, the tubes being angularly spaced about the furnace enclosure, adjacent the inner wall of refractory 22. One such assembly is shown in detail in FIG. 3.

The heating assembly there shown includes an elongated vertical tube indicated generally at 190 having, near its upper end, a support ring 192 provided with a downwardly extending flange 194 resting upon the upper plate 16 of the furnace. The lower portion of the flange 194 is embedded in sand or similar granular material 197 contained in an annular trough defined by upstanding inner and outer flanges 195 and 196 respectively fixed to the upper plate 16 and projecting upwardly therefrom. It will be understood that the sand or similar material 197 in the trough formed by flanges 195 and 196 constitutes a seal in the same manner as described in connection with the fitting of cover 70 on upper plate 16.

The heater tube 190 passes through an enlarged opening 198 formed in plate 16 and refractory 24, there being sufficient radial clearance between the tube and the opening to permit expansion of the tube under conditions of high temperature during operation. Similarly, at its lower end tube 190 passes through opening 199 in the furnace base, with radial clearance to permit radial expansion of the tube.

Means are provided for sealing against air entrance into the furnace around tube 190 and for permitting vertical movement of the lower annular edge of the tube incident to linear expansion and contraction of the tube under the large range of temperature change to which the tube is subjected. Such means are here shown as including a cup indicated generally at 200 mounted on the lower surface of base plate 10 and containing a quantity of liquid 201 such as oil or the like in which the lowermost edge 202 of tube 190 is immersed. Cup 200 is provided with a central annular collar 204 extending upwardly from its base 205 to a point above the level of the liquid 201 in the cup. Extending upwardly through the collar 204 is a gas conduit 206, terminating upwardly in a burner jet 208, and supplied with combustible gas from a suitable source through conduit 209. As will be seen in FIG. 2, a generally circular manifold tube or header 210 connects the several heating elements for supplying combustible gas thereto. It will be noted that a secondary air inlet for combustion of the gas from jet 208 is supplied by the radial clearance between tube 206 and annular collar 204.

Conventional means may be provided for sensing the temperature within the furnace, and particularly the temperature at or near the end of the travel of workpieces on the helical table 30. In the present illustration such sensing means may include a thermocouple indicated generally at 210, provided with a sensing tip 212 and extending through the cylindrical side wall 12, 22 of the furnace. It is provided with a pair of electrical leads 214 adapted to be connected to conventional circuitry and valve apparatus (not shown) for controlling the temperature within the present furnace.

Workpieces progress through the present furnace from the feed platform 120 and apron 130 into the feed chute 100, being so moved by the cyclic vibratory movement imparted to the feed platform and apron by the cam 124 and spring 127 heretofore described. Comparison of those parts as shown in FIGS. 4 and 6 will clarify the operation. Thus in FIG. 6 the parts are shown as cam 124 begins to retract the feed platform 120 and apron 130 rightwardly against the force of spring 127. In FIG. 4 the parts are substantially at their right limit of travel, and a moment later will be forced leftwardly to their positions seen in FIG. 6. Such movement is translated into rotational vibration of table 30 by the interconnecting means 140, 141, 142 between the apron 130 and the helical table 30 causing the workpieces to progress downwardly along the helix. At the lower end, the workpieces fall through discharge chute 60 into the quench bath 172, from which they may be later removed for use or further processing.

Accordingly, it will be seen that the furnace of the present invention provides a very compact construction by which to raise workpieces to a desired temperature for proper heat treatment, including means for controlling the composition of the atmosphere within the furnace enclosure. It will be readily understood that the speed of cyclic rotational vibration imparted to the helical feed table, the temperature to which the workpieces are raised during their travel through the furnace, and other parameters may be varied within wide limits without departing from the spirit of the invention.

I claim:

1. A heat treatment furnace including a housing having an upper workpiece receiving end and a lower workpiece discharging end, comprising:

a table within the housing providing a generally helical path about an axis inclined to the horizontal for workpiece travel between said ends;
means at the upper and lower table ends for journaling the table to the housing for table movement about said axis;
and means for imparting cyclic rotational vibration to the table.

2. The invention as defined in claim 1 wherein said axis is vertical.

3. The invention as defined in claim 2 including a workpiece feed platform at the housing upper end having a longitudinally extending generally horizontal bed, and wherein said vibration imparting means cyclically moves said platform reciprocatingly.

4. The invention as defined in claim 3 including a feed apron for receiving workpieces from the platform and delivering them to said upper end.

5. The invention as defined in claim 2 wherein the housing includes an upper portion provided with an opening formed therein adapted to permit axial passage of the table therethrough and a cover closing said opening and removably attachable to the upper portion.

6. The invention as defined in claim 5 wherein the upper journaling means includes interengageable means carried by the cover and the table for permitting rotational and axial movement of the table upper end.

7. The invention as defined in claim 2 wherein said vibration imparting means includes resilient means urging the table in one angular direction corresponding to forward workpiece travel, means cyclically moving the table in the opposite angular direction against the force of the resilient means, and buffer means limiting table angular movement in said one direction.

8. The invention as defined in claim 2 wherein the housing workpiece receiving end is provided with an opening for workpiece travel therethrough and means providing a curtain of flame across the opening.

9. The invention as defined in claim 2 including a quench tank at the housing lower end for receiving workpieces from the table.

10. The invention as defined in claim 9 including means for introducing a desired gas via the quench tank into the housing.

References Cited

UNITED STATES PATENTS

| | | | |
|---|---|---|---|
| 2,007,009 | 7/1935 | Staples | 263—7 |
| 2,014,598 | 9/1935 | Staples | 263—7 X |
| 3,245,131 | 4/1966 | Kimble | 263—6 |
| 3,380,721 | 4/1968 | Petrikov | 263—6 |

JOHN J. CAMBY, Primary Examiner

U.S. Cl. X.R.

263—6